Aug. 26, 1947.  J. GABLER  2,426,302
ELECTRIC WATER HEATER
Filed May 18, 1945  2 Sheets-Sheet 1
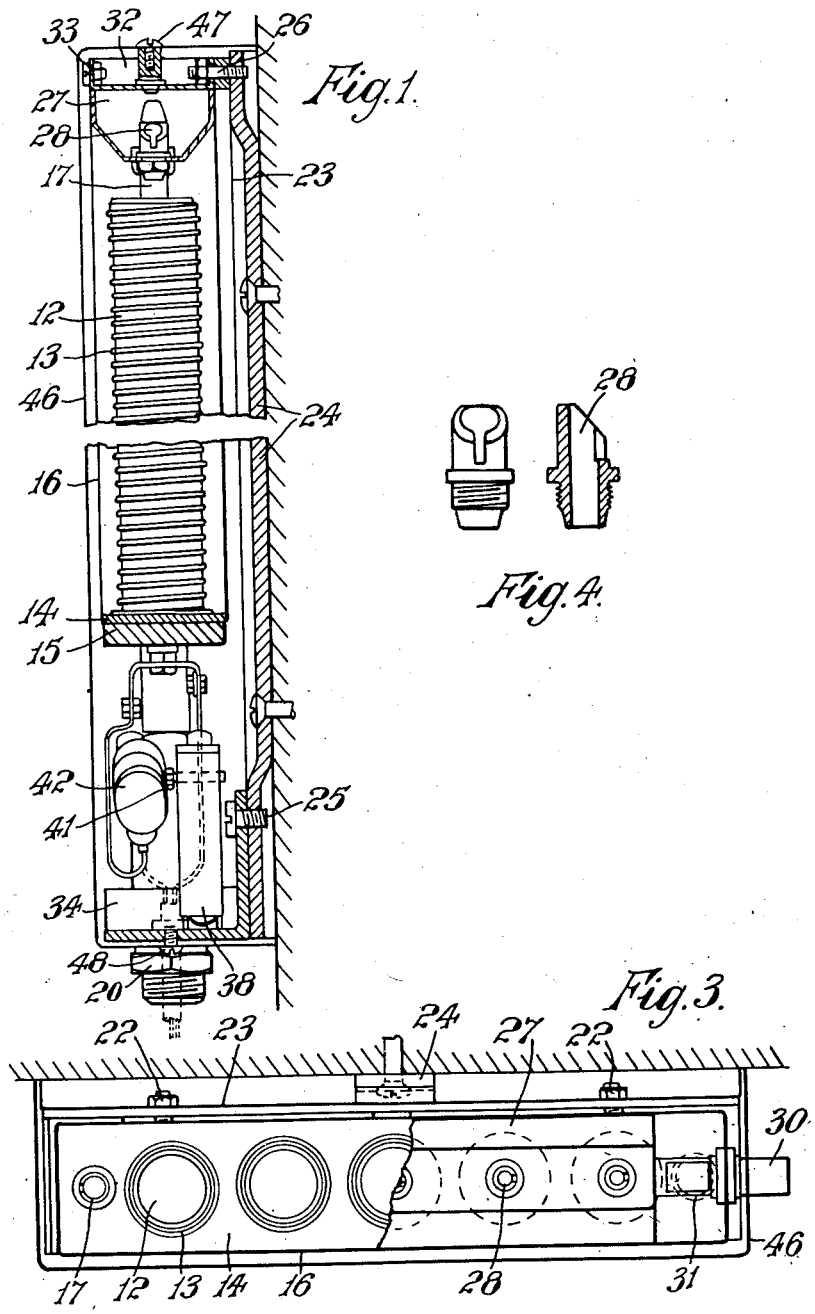
Inventor
JOHN GABLER
By Otto Munk
HIS ATTY

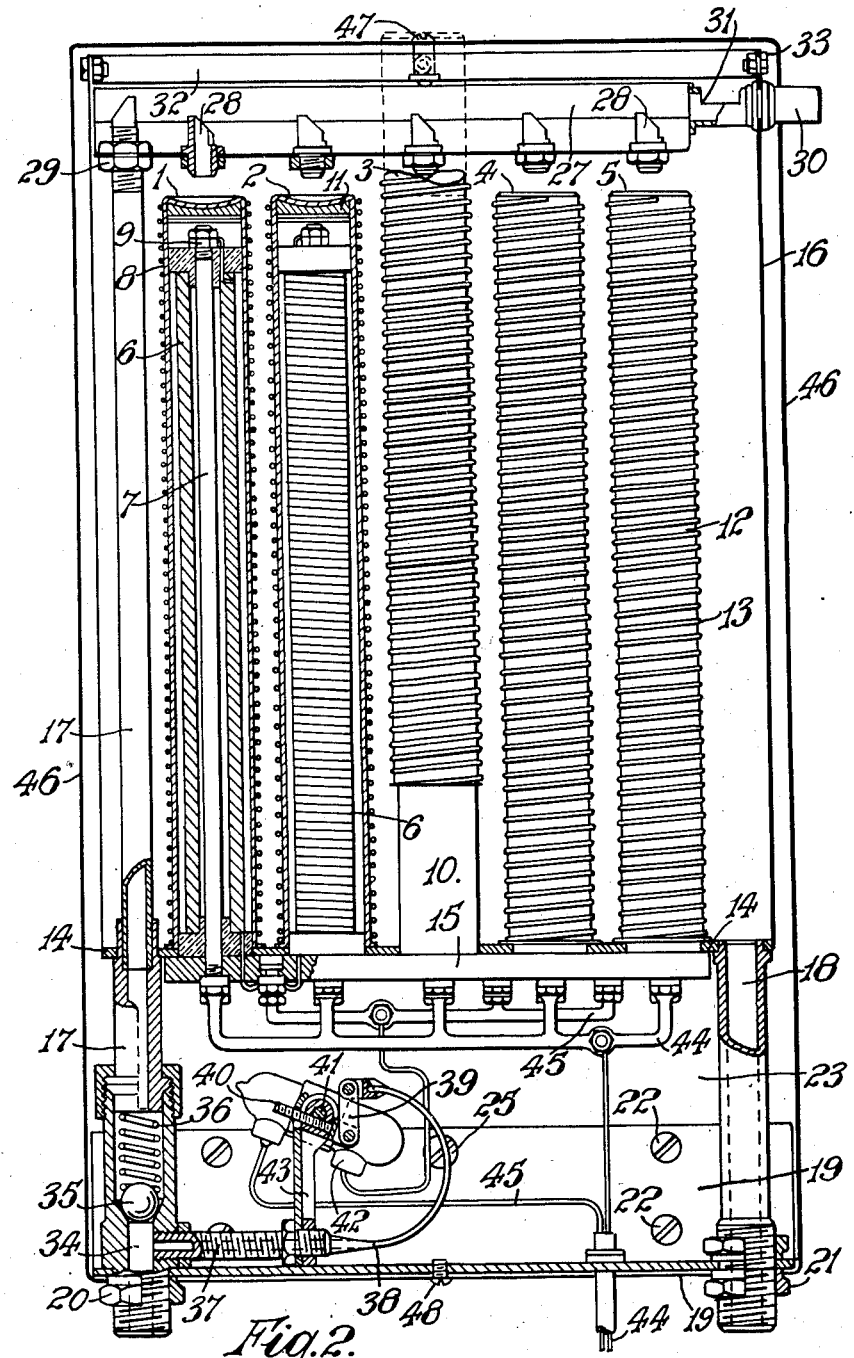

Patented Aug. 26, 1947

2,426,302

UNITED STATES PATENT OFFICE 2,426,302

ELECTRIC WATER HEATER

John Gabler, London, England

Application May 18, 1945, Serial No. 594,430
In Great Britain May 22, 1944

6 Claims. (Cl. 219—39)

This invention relates to electric water heaters.

One object of the invention is to provide an electric water heater in which, when out of action, no water is retained in contact with the heating surfaces.

A further object of the invention is to provide a water heater consisting of a plurality of independent heating units over which the water to be heated flows in a thin film and in a uniform manner.

Still a further object of the invention is to provide an electric water heater in which the heating elements only operate when water is introduced into the apparatus.

With the foregoing object and other objects in view, an electric water heater in accordance with the invention comprises a plurality of upstanding tubular casings, closed at their upper ends and containing electric heating elements, with means for closing the circuit of such elements by the pressure of water delivered to the water heater, means for distributing such water to fall on to the closed upper ends of the tubular casings and means for delivering water from and heated by the casings.

The upstanding tubular casings are mounted on a base plate which forms the bottom of a closed chamber enclosing the tubular heater casings. The upper portion of this chamber contains a closed shallow tank, to which cold water is supplied and from which such water overflows down an upstanding weir pipe above and dropping the water on to each tubular heater casing, the closed upper end of which conveniently is concave.

Hot water flows out of an outlet at the bottom of the chamber.

In order to delay the flow of water down the outer surface of each tubular heater casing, each thereof may provide a helical path for the water by a helically wound wire, of square or other cross section, thereon, or by a helical fin.

Water admitted to the distributing tank can be arranged to close the circuit of the electric heater elements by the main pressure of the water, choked by having to pass a spring-pressed non-return valve, displacing a diaphragm or flexing a Bourdon tube which, through linkage raises a mercury switch to the circuit closing position. In order to cause the switch automatically to open the heater circuit, it is pivoted at the end remote from that raised by the diaphragm or Bourdon tube, so that on water no longer being admitted to displace the diaphragm, the support by the latter of the mercury switch is withdrawn, and the mercury switch drops under the influence of its own weight.

In the accompanying drawings, which illustrate diagrammatically and by way of example, one embodiment of the invention:

Fig. 1 is a transverse vertical section;

Fig. 2 is a longitudinal vertical section;

Fig. 3 is a plan view with the cover of the casing removed; and

Fig. 4 is a detail.

The water heater shown consists of a battery of five tubular heating bodies 1, 2, 3, 4, 5. The heating body 1 is shown in vertical section. Each heating body comprises a tubular wire-wound heating element 6 which is shown in elevation in the heating body 2. Each heating element 6 is carried by a rod 7 and is clamped in position between two insulating discs 8, 8 by a terminal nut 9. Each heating element 6, is also enclosed in a tubular casing 10 having a dished closed upper end 11. Each casing 10 is in turn closely surrounded by a withdrawable outer tubular casing 12 having a similarly dished closed upper end and wound with a wire helix 13.

The five heating bodies 1, 2, 3, 4, 5 are brazed to a metal plate 14 to which is secured a base plate 15 of insulating material. The whole assembly is enclosed in an inner metal casing 16, the lower end of which is brazed to the metal plate 14.

Projecting into the casing 16 is a water inlet tube 17 whilst a water outlet tube 18 is provided at the underside of the opposite end of the casing 16. These tubes are brazed to the casing 16 and serve to support the same. The tubes 17 and 18 are secured to a stout bracket 19 by nuts 20, 21, while the upright end of the bracket 19 is fixed by screws 22 to a back plate 23 which in turn is secured to a dished mounting bar 24 by a screw 25. At its upper end the casing 16 is secured to the back plate and mounting bar by a nut 26.

The upper part of the casing 16 carries a distributing trough 27 which carries five overflow weir pipes 28 of the chamfered and slotted construction shown in Fig. 4.

The trough 27 is clamped to the inlet tube 17 by clamping nuts 29 and is provided with a lateral overflow tube 30 leading outside the casing 16. Said tube 30 has a cut-out portion 31 permitting escape of steam from the casing 16. The top of the casing 16 is provided with a dished cover 32 secured thereto by nuts 33 and 26.

At the inlet end of the tube 17 is a ball valve 34 comprising a ball 35 loaded by a compression spring 36. Beneath said ball valve is a branch tube 37 leading to a Bourdon tube 38. Pivoted to the end of said Bourdon tube 38 is one end of a link 39, the other end of which link is connected to a screw 40 which actuates the spindle 41 of the holder of a mercury switch 42 which is mounted on a bracket 43.

Current is supplied to the heating bodies 1, 2, 3, 4, 5 through current leads 44, 45. The whole apparatus is covered by an outer casing 46 which is secured at its top to the cover 32 of the casing 16 by a screw 47 and at its lower end to the bracket 19 by a screw 48.

The apparatus operates as follows:

When connected to a water main and to a source of current and when the water is turned on, the water entering the inlet conduit 17 encounters the resistance of the ball valve 34, being thereby forced into the branch 37 and Bourdon tube 38 which is thus flexed and thereby tilts the mercury switch 42 into the "on" position thereby heating up the heating bodies 1, 2, 3, 4, 5. When the pressure of the incoming water has overcome the resistance of the ball valve 34, the water rises through the tube 17 into the trough 27 rising therein until it encounters the slots in the weirs 28. It then flows through the weirs 28 on to the dished top ends of the heating bodies 1 to 5, and from thence flows down in a helical path along the wire helices 13, thereby becoming rapidly and uniformly heated. The hot water arriving at the bottom of each heating body then issues through the outlet pipe 18.

When the inlet of water to the apparatus is stopped, the pressure on the Bourdon tube is released and the same returns the mercury switch 42 into the "off" position. The hot water immediately drains away through the outlet 18 whilst any residual moisture remaining in the apparatus is converted by the residual heat of the heating bodies 1 to 5, into steam which issues through the tube 30, thus leaving the apparatus completely dry.

In order to ensure freedom of the heating bodies 1 to 5 from scale the outer casings 12 are made removable for cleaning purposes. That of the heating body 3 is shown partially withdrawn and broken away.

I claim:

1. In an electric water heater, a closed bottomed vessel, a water outlet pipe leading from the bottom of said vessel, a plurality of closed topped inner tubular casings upstanding from said bottom of and within said vessel, an electric heater element in each said inner tubular casing, a withdrawable outer tubular casing closely surrounding each said inner tubular casing, a trough above said tubular casings, an overflow weir pipe in the bottom of said trough above each said tubular casing, a water inlet pipe leading to said trough, a loaded valve in said water inlet pipe, a pressure-deflected device connected to said water inlet pipe in advance of said valve, and an electric switch in the circuit of said heater elements operated by said pressure-deflected device.

2. In an electric water heater, a closed bottomed vessel, a water outlet pipe leading from the bottom of said vessel, a plurality of closed topped inner tubular casings upstanding from said bottom of and within said vessel, an electric heater element in each said inner tubular casing, a withdrawable outer tubular casing closely surrounding each said inner tubular casing, a trough above said tubular casings, an overflow weir pipe in the bottom of said trough above each said tubular casing, a water inlet pipe leading to said trough, a loaded valve in said water inlet pipe, a pressure-deflected device connected to said water inlet pipe in advance of said valve, and a mercury switch in the circuit of said heater elements connected to and operated by said pressure-deflected device.

3. In an electric water heater, a closed bottomed vessel, a water outlet pipe leading from the bottom of said vessel, a plurality of closed topped inner tubular casings upstanding from said bottom of and within said vessel, an electric heater element in each said inner tubular casing, a withdrawable outer tubular casing closely surrounding each said inner tubular casing, a trough above said tubular casings, an overflow weir pipe in the bottom of said trough above each said tubular casing, a water inlet pipe, leading to said trough, a loaded valve in said water inlet pipe, a Bourdon tube connected to said water inlet pipe in advance of said valve, and an electric switch in the circuit of said heater elements operated by said Bourdon tube.

4. In an electric water heater, a closed bottomed vessel, a water outlet pipe leading from the bottom of said vessel, a plurality of closed topped inner tubular casings upstanding from said bottom of and within said vessel, an electric heater element in each said inner tubular casing, a withdrawable outer tubular casing closely surrounding each said inner tubular casing, a trough above said tubular casings, an overflow weir pipe in the bottom of said trough above each said tubular casing, a water inlet pipe, leading to said trough, a loaded valve in said water inlet pipe, a Bourdon tube connected to said water inlet pipe in advance of said valve, and a mercury switch in the circuit of said heater elements and connected to and operated by said Bourdon tube.

5. In an electric water heater, a closed bottomed vessel, a water outlet pipe leading from the bottom of said vessel, a plurality of closed topped inner tubular casings upstanding from said bottom of and within said vessel, an electric heater element in each said inner tubular casing, a withdrawable outer tubular casing closely surrounding each said inner tubular casing, a wire helix closely surrounding each said outer tubular casing, a trough above said tubular casings, an overflow weir pipe in the bottom of said trough above each said tubular casing, a water inlet pipe leading to said trough, a loaded valve in said inlet pipe, a pressure-deflected device connected to said water inlet pipe in advance of said valve, and an electric switch in the circuit of said heater elements operated by said pressure-deflected device.

6. In an electric water heater, a closed bottomed vessel, a water outlet pipe leading from the bottom of said vessel, a plurality of closed topped inner tubular casings upstanding from said bottom of and within said vessel, an electric heater element in each said inner tubular casing, a withdrawable outer tubular casing closely surrounding each said inner tubular casing, a wire helix closely surrounding each said outer tubular casing, a trough above said tubular casings, an overflow weir pipe in the bottom of said trough above each said tubular casing, a water inlet pipe leading to said trough, a loaded valve in said inlet pipe, a Bourdon tube connected to said water inlet pipe in advance of said valve, and a mercury switch in the circuit of said heater elements and connected to said Bourdon tube.

JOHN GABLER.

REFERENCES CITED

The following references are of record in the file of this patent:

UNITED STATES PATENTS

| Number | Name | Date |
|---|---|---|
| 944,050 | Rains | Dec. 21, 1909 |
| 576,208 | Lozier | Feb. 2, 1897 |
| 1,548,779 | Falkenberg | Aug. 4, 1925 |
| 1,759,281 | Rosenberger | May 20, 1930 |
| 1,977,156 | Staley | Oct. 16, 1934 |
| 2,081,206 | Parker | May 25, 1937 |
| 2,284,414 | Gammon | May 26, 1942 |